US008463799B2

(12) United States Patent
Davis et al.

(10) Patent No.: US 8,463,799 B2
(45) Date of Patent: Jun. 11, 2013

(54) SYSTEM AND METHOD FOR CONSOLIDATING SEARCH ENGINE RESULTS

(75) Inventors: Michelle Davis, Raleigh, NC (US); Mark E. Maresh, Research Triangle Park, NC (US); Eric A. Stegner, Research Triangle Park, NC (US); Robert W. Stegner, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/172,029

(22) Filed: Jun. 29, 2011

(65) Prior Publication Data

US 2013/0007023 A1    Jan. 3, 2013

(51) Int. Cl.
  *G06F 7/00* (2006.01)
  *G06F 17/00* (2006.01)
  *G06F 17/30* (2006.01)

(52) U.S. Cl.
  USPC ............................ 707/752; 707/748; 707/721

(58) Field of Classification Search
  USPC ..................... 707/726, 736, 706, 769; 706/45
  See application file for complete search history.

(56) References Cited

U.S. PATENT DOCUMENTS

| 6,546,388 | B1 * | 4/2003 | Edlund et al. .......................... 1/1 |
| 7,739,277 | B2 * | 6/2010 | Meyerzon et al. ............. 707/726 |
| 7,805,428 | B2 * | 9/2010 | Batista Reyes et al. ...... 707/706 |
| 7,856,411 | B2 * | 12/2010 | Darr ................................. 706/45 |
| 8,019,758 | B2 * | 9/2011 | Zheng et al. .................. 707/736 |
| 2005/0289125 | A1 * | 12/2005 | Liu et al. ............................ 707/3 |
| 2006/0085741 | A1 | 4/2006 | Weiner et al. |
| 2007/0209080 | A1 | 9/2007 | Ture et al. |
| 2009/0006358 | A1 * | 1/2009 | Morris et al. ..................... 707/5 |
| 2010/0010984 | A1 | 1/2010 | Matias |
| 2010/0185611 | A1 | 7/2010 | Liao et al. |
| 2010/0312782 | A1 * | 12/2010 | Li et al. ......................... 707/769 |

* cited by examiner

*Primary Examiner* — Susan Chen
(74) *Attorney, Agent, or Firm* — Lieberman & Brandsdorfer, LLC

(57) ABSTRACT

Embodiments of the invention relate to query processing and consolidation of query results. Multiple queries may be submitted to one or more search engines, with each query having the same or different returned query items with the same or different sorting arrangement of the returned query items. The returned query items are consolidated into a single sorted set, with the sort being based upon a logical assessment and comparison of the multiple returned query items.

15 Claims, 7 Drawing Sheets

FIG. 5

| URL | Search 1 | C1 | Search 2 | C2 | Search 3 | C3 |
|---|---|---|---|---|---|---|
| a | 1 | 1 | 2 | 2 | 10 | 2 |
| b | 2 | 2 | 3 | 3 | 12 | 4 |
| c | 3 | 3 |   | 6 |   | 6 |
| d | 4 | 4 | 25 | 6 | 3 | 3 |

FIG. 6

| URL | Wt Ave | Search 1 | C1 | Search 2 | C2 | Search 3 | C3 |
|---|---|---|---|---|---|---|---|
| a | 1.67 | 1 | 1 | 2 | 2 | 10 | 2 |
| b | 3 | 2 | 2 | 3 | 3 | 12 | 4 |
| c | 5 | 3 | 3 |   | 6 |   | 6 |
| d | 4.33 | 4 | 4 | 25 | 6 | 3 | 3 |

FIG. 7

| URL | Wt Ave |
|---|---|
| a | 1.67 |
| b | 3 |
| d | 4.33 |
| c | 5 |

SYSTEM AND METHOD FOR CONSOLIDATING SEARCH ENGINE RESULTS

BACKGROUND

1. Technical Field

The present invention relates to a method and system for compilation of query results. More specifically, the invention relates to a system and method that consolidates and sorts multiple query results into a single sorted result set.

2. Description of the Prior Art

With the growth of the Internet, there is an abundant quantity of sites and data therein available to users of the Internet. There is also a selection of programs that search documents for specified keywords and return a list of documents where the keywords are found. These programs are commonly referred to as search engines. Typically, a search engine works by sending out a spider to fetch as many documents as possible. Another program, called an indexer, then reads these documents and creates an index based on the words contained in each document. Each search engine uses a proprietary algorithm to create its indices for each query.

It is known that different search engines, each with their proprietary algorithm, may return different results for the same query. A user may submit the same search to different search engines to access the different returned results. To find the most relevant query results, the user must manually review different search results from either different queries and/or different search engines.

SUMMARY OF THE INVENTION

This invention comprises a method, system, and apparatus for consolidating and sorting multiple search query results.

In one aspect of the invention, a computer implemented method is provided for consolidation of search queries. More specifically, a first query is submitted with a first arrangement of a string of characters, and a first set of search results are returned in a first sorted order. Following the first query, a second query is submitted, with the second query having a changed arrangement of the string of characters, referred to herein as a second arrangement. A second set of search results are returned in a second sorted order. A calculated value is assigned to each returned item in each of the first and second sets of results. In addition, a weighted average value is calculated for each of the returned items, with the weighted value based on the associated calculated values. The first sorted order of the first set of search results is sorted based upon the calculated weighted average value, thereby consolidating multiple queries into a single sorted set of results.

In another aspect, a computer program product is provided as a service through a network connection. The computer program product includes a computer-readable storage medium having computer readable program code embodied thereon, which when executed causes a computer to implement a method pertaining to consolidation of query results. Computer readable program code is provided to receive and process a query submission. The query submission includes a first arrangement of a string of characters, with the first set of search results returned from the processed query submission in a first sorted order. Computer readable program code is also provided to receive and process a second query submission with a second set of search results returned from the processed second query submission in a second sorted order. The second query submission is a second arrangement of the string of characters, wherein the second arrangement of character strings is different from the first arrangement of character strings. Computer readable program code is provided to compare the first and second sets of search results, and to assign a calculated value to each item returned in each of the first and second sets of search results. In addition, computer readable program code is provided to calculate a weighted average value based on the associated calculated values for each returned item in each of the first and second sets of search results. Computer readable program code sorts the first sorted order based on the calculated weighted average value.

In yet another aspect, a system is provided with a server configured to receive a query. A functional unit is provided in communication with the server, with the functional unit to support consolidation of query results. The functional unit is provided with a query manager, a comparison manager, and a sort manager. The query manager functions to support multiple query submissions, including at least a first query and a second query. The query manager submits the first query having a first arrangement of strings of characters, and a first set of search results are returned to the query manager in a first sorted order. In addition, the query manager supports submission of the second query, with the second query having a second arrangement of the string of characters different from the string character arrangement of the first query submission. Following the submission of the second search query, a second set of results are returned in a second sorted order. The comparison manager functions to compare the first and second sets of search results. More specifically, the comparison manager assigns a calculated value to each item returned in each of the first and second sets of search result, and then calculates a weighted average value based on the associated calculated values. The sort manager then sorts the first sorted order based on the calculated weighted average value as process by the comparison manager.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

FIG. 5 is a block diagram illustrating returned query results and the organization and sorting thereof.

FIG. 6 is a block diagram illustrating returned query results, calculated values, and an assessed weighted average.

FIG. 7 depicts a block diagram illustrating a sort of the returned query results, together with the calculated values, and assessed weighted averages.

DETAILED DESCRIPTION

Figure 1:
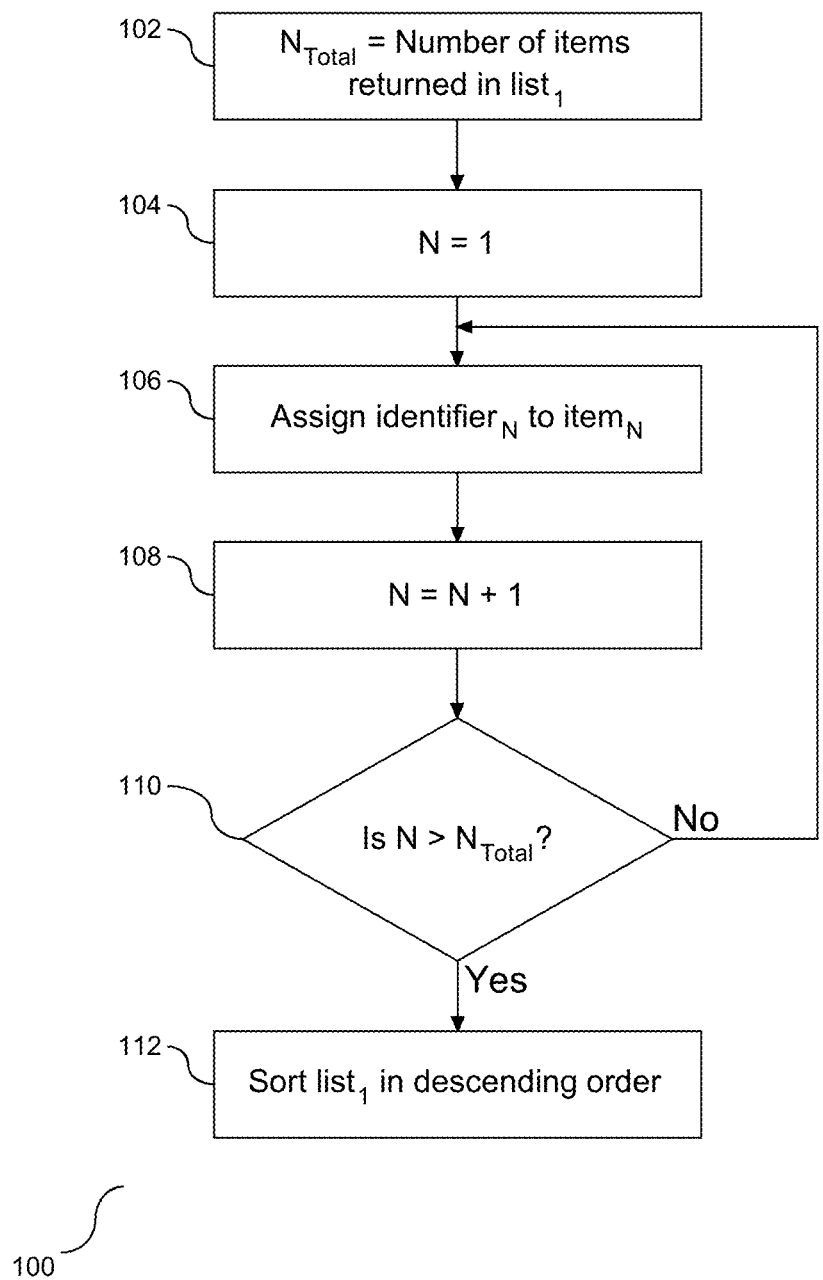
FIG. 1 is a flow chart illustrating a process for receiving query results from a query submitted to a search engine.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional unit described in this specification has been labeled with tools, modules, and/or managers. The functional unit may be implemented in programmable hardware devices such as field programmable gate arrays, programmable array logic, programmable logic devices, or the like. The functional unit may also be implemented in software for execution by various types of processors. An identified functional unit of executable code may, for instance, comprise one or more physical or logical blocks of computer instructions which may, for instance, be organized as an object, procedure, function, or other construct. Nevertheless, the executables of an identified functional unit need not be physically located together, but may comprise disparate instructions stored in different locations which, when joined logically together, comprise the functional unit and achieve the stated purpose of the functional unit.

Indeed, a functional unit of executable code could be a single instruction, or many instructions, and may even be distributed over several different code segments, among different applications, and across several memory devices. Similarly, operational data may be identified and illustrated herein within the functional unit, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of modules, managers, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

In the following description of the embodiments, reference is made to the accompanying drawings that form a part hereof, and which shows by way of illustration the specific embodiment in which the invention may be practiced. It is to be understood that other embodiments may be utilized because structural changes may be made without departing form the scope of the present invention.

Use of search engines on an interconnected network of computers also referred to herein as the Internet, has become a popular method of finding information. More specifically, search engines are publicly available on the Internet and are used to find data available on the plurality of sites connected to the Internet. Most search engines employ their own proprietary algorithms to support queries and to return query results. In one embodiment, the query results include a list of uniform resources locators (URLs), also known as a world wide web address. There are several issues that are challenging when organizing and presenting query results from a search engine. The issues include limiting the quantity of items presented in the search results, comparing different orders of the same search string and the associated results, and comparing the same or different orders of the same search string presented to different search engines and the associated results. Accordingly, there is a need to assess and sort the results of multiple queries in a single returned list.

FIG. 1 is a flow chart (100) illustrating a process for receiving query results from a query submitted to a search engine. The variable $N_{Total}$ is assigned to the quantity of items returned in the query results (102), and a counting variable N is assigned to the integer one (104). An identifier, $ID_N$, is assigned to $item_N$ (106). In one embodiment, the identifier $ID_N$ is a numerical value associated with the position of $item_N$ in a listing of query results. Following the assignment at step (106), the counting variable N is incremented (108) followed by determining if all of the items returned in the query results have been evaluated and assigned an identifier (110). A negative response to the determination at step (110) is followed by a return to step (106). Conversely, a positive response to the determination at step (110) concludes the identifier assignment process. Following completion of the assignment of identifiers, the query results are sorted into a list (112). In one embodiment, the list is sorted in descending order based upon the numerical identifiers assigned to each returned item. Similarly, in one embodiment, the list may be sorted in ascending order based upon the assigned numerical identifiers. Accordingly, each item returned in the query is evaluated to compile a first sorted list, $list_1$, of query results.

In general, a query submitted to a search engine is an arrangement of a string of characters. A query submission of the string of characters in a first arrangement to a search engine may produce one set of results, with a second arrangement to the search engine producing a second set of results that is different from the first set of results. In one embodiment, the second arrangement includes the same string characters as the first arrangement but in a different order. Similarly, in another embodiment, the second arrangement includes a different string of characters from the first arrangement. As such, a second sorted list, $list_2$, may be produced in a similar manner to that shown in FIG. 1, but based upon the second arrangement of the string of characters.

Different users may develop an affinity to different search engines. More specifically, users may submit the same query to different search engines to receive a different set of search results. For example one, the first or second arrangement of the string of characters may be submitted to a second search engine producing a third set of results, list₃, that is different from the first or second set of results. As demonstrated in FIG. 1, regardless of the search engine or the arrangement of the string of characters, a sorted list of query results is created with each item in the list having an identifier representing a hierarchical placement of each item in the list. In one embodiment, each identifier is a numerical value associated with the numerical placement within the respective list.

Figure 2:
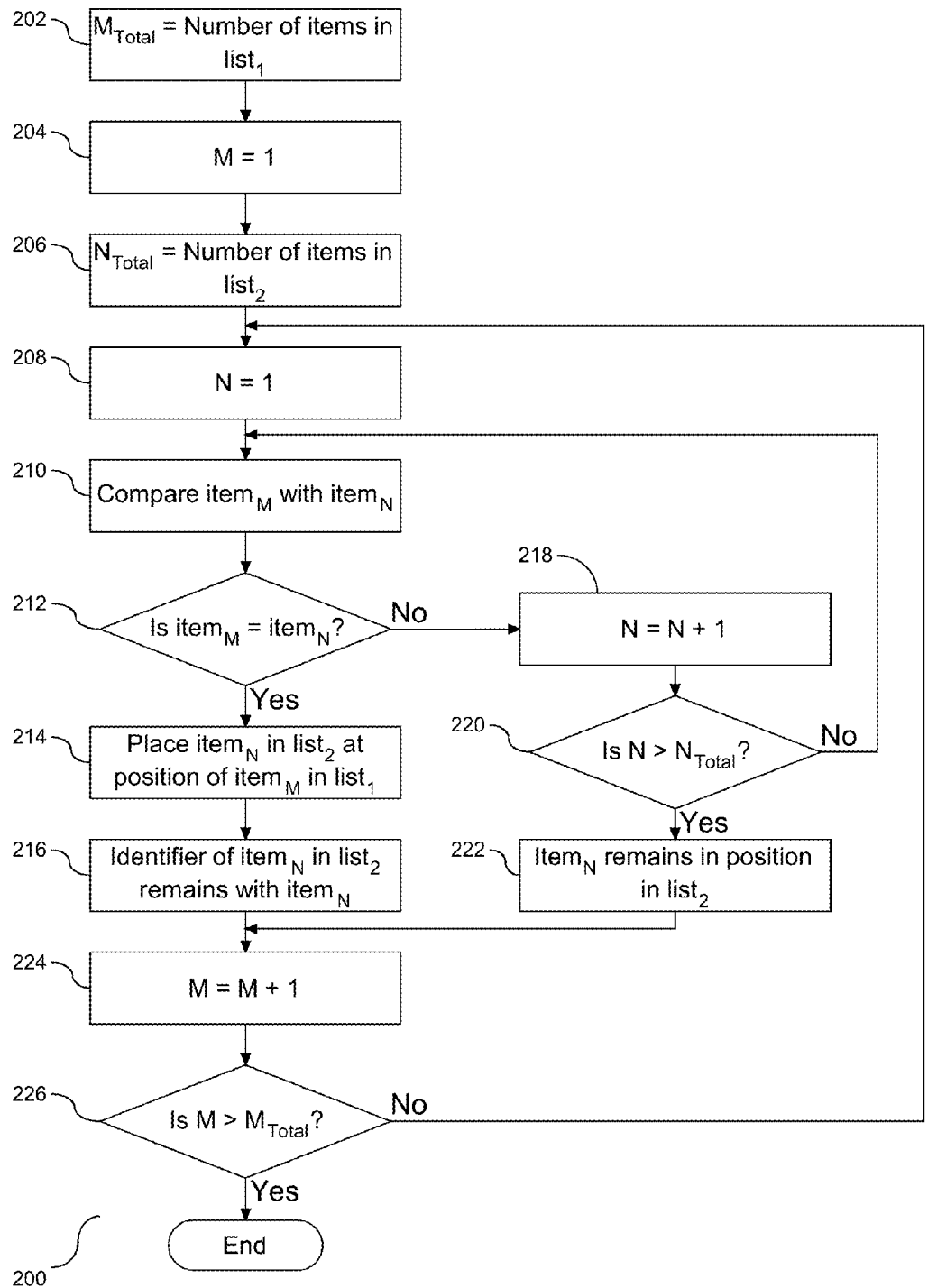
FIG. 2 is a flow chart illustrating a process for aligning the query results of a second search with the query results of a first search.

To compare the query results of multiple searches to the same search engine or to different search engines, the sorted lists need to be arranged in a manner that aligns the query results. More specifically, it is the actual results that are returned from the query that are compared, with the position of the results in the different lists employed for consolidation. As shown in FIG. 1, each returned item is assigned an identifier based upon their position in the first list. FIG. 2 is a flow chart (200) illustrating a process for aligning the query results of a second search with the query results of a first search. The variable $N_{Total}$ is assigned to the quantity of items returned in the second search and organized into list₂ (202), and a counting variable N for the second list is assigned to the integer one (204). Similarly, the variable $M_{Total}$ is assigned to the quantity of items returned in the first search and organized into list₁ (206), and a counting variable M for the first list is assigned to the integer one (208). Following the assignment at step (208), item$_M$ is compared with item$_N$ (210). More specifically, it is determined if item$_M$ is equivalent to item$_N$ (212). A positive response to the determination at step (212) is followed by placing item$_N$ in list₂ at the position of item$_M$ in list₁ (214). In addition, the identifier associated with item$_N$ in list₂ remains with item$_N$ (216), i.e. the same identifier value as prior to the new position assignment. Accordingly, the items in list₂ are aligned with the items in list₁ based upon the positions in list₁ while retaining their original identifier and the associated identifier value.

As explained above, different search strings and different search engines may produce different query results or a different order of the same query results. A negative response to the determination at step (212) is an indication that the first item in list₁ does not match with the first item in list₂. As such, the counting variable N associated with the second list is incremented (218), followed by determining if all of the items in the second search list, list₂, have been compared with the returned items of the first search list, list₁, (220). A negative response to the determination at step (220) is followed by a return to step (210), and a positive response to the determination at step (220) concludes the alignment process for the first item in list₁. At the same time, a positive response to the determination at step (220) is an indication that there is no match in the second list, list₂, for the first item in the first list, list₁. As such, item$_N$ remains in its position in list₂ with its associated identifier (222). To continue the alignment of the lists through each item in list₁, following either step (216) or (222) the variable M is incremented (224). It is then determined if all of the items in the first list, list₁, have been reviewed for alignment with the second list, list₂ (226). A negative response to the determination at step (226) is followed by a return to step (208) to continue the alignment process. Whereas, a positive response to the determination at step (226) concludes the alignment of list₁ and list₂ (228). It is understood that the alignment process shown herein is applicable to more than two sets of search results. In one embodiment, the alignment process may be extrapolated and applied to three or more sets of query results and alignment thereof.

Figure 3:
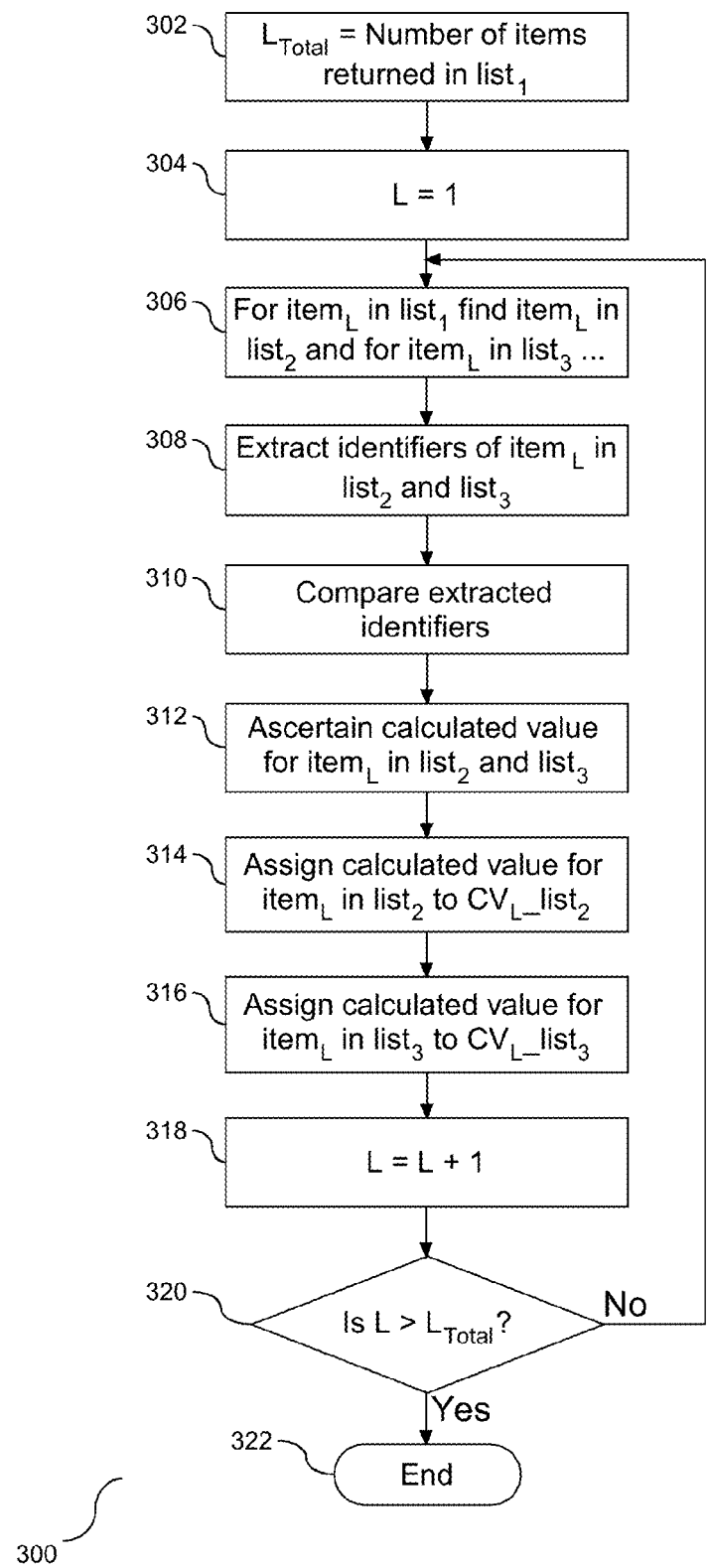
FIG. 3 is a flow chart illustrating a process for assessing and assigning a calculated value to each item listed in the secondary lists.

Once the alignment process is completed, as shown in FIG. 2, for each item in the list a calculated result is ascertained. More specifically, the calculated result is a numerical value assigned to the items listed in the secondary lists, list₂, list₃, etc., based upon a logical assessment of both their new aligned position and their prior position, with the prior position classified by the identifier. FIG. 3 is a flow chart (300) illustrating a process for assessing and assigning a calculated value to each item listed in the secondary lists. The following process is illustrated with two secondary lists. However, in one embodiment, the process may be extrapolated for three or more secondary lists. The variable $L_{Total}$ is assigned to the quantity of items returned in the first query list, list₁ (302), and a counting variable L is assigned to the integer one (304). For item$_L$ in list₁ in the alignment of the query results, find item$_L$ in list₂ and list₃ (306). Following step (306), the identifiers associated with item$_L$ in each of list₂ and list₃ are extracted (308). Each of the extracted identifiers is compared with the identifier in the other two lists (310). More specifically, the extracted identifier associated with item$_L$ in list₂ is compared with the extracted identifiers in list₁ and list₃, and the extracted identifier associated with item$_L$ in list₃ is compared with the extracted identifiers in list₁ and list₂. A calculated result is ascertained for each item subject to evaluation in both list₂ and list₃ (312). Specifically, the calculated result is the smaller of the search order of the item under consideration or a multiplication factor (e.g. double) of the smallest search order, with the search order being the identifier associated with the item from the initial query result. The invention should not be limited to the specific formula for ascertaining the calculated result. In one embodiment, different formulations may be employed for the logical assessment applied to the query results. Accordingly, for each item in each of the secondary lists, list₂ and list₃, a calculated result is ascertained.

In further detail of the calculation at step (312), the calculated value is ascertained for item$_L$ in list₂ and assigned to the variable CV$_L$_list₂ (314) and the calculated value is ascertained for item$_L$ in list₃ and assigned to the variable CV$_L$_list₃ (316). Following the assignment at step (316), the counting variable L is incremented (318). It is then determined if all of the items in the returned list have been evaluated and assigned a calculated value (320). A negative response to the determination at step (320) is followed by a return to step (306). Conversely, a positive response to the determination at step (320) concludes the process of ascertaining a calculated value for each query item in list₂ and list₃ (322). As illustrated, the calculated value is logically ascertained for the query items returned in list₂ and list₃. For the query items returned in list₁, the calculated value is the same as the identifier value. Accordingly, for each query item returned in each list, e.g. list₁, list₂, and list₃, a calculated value is assessed and assigned.

Figure 4:
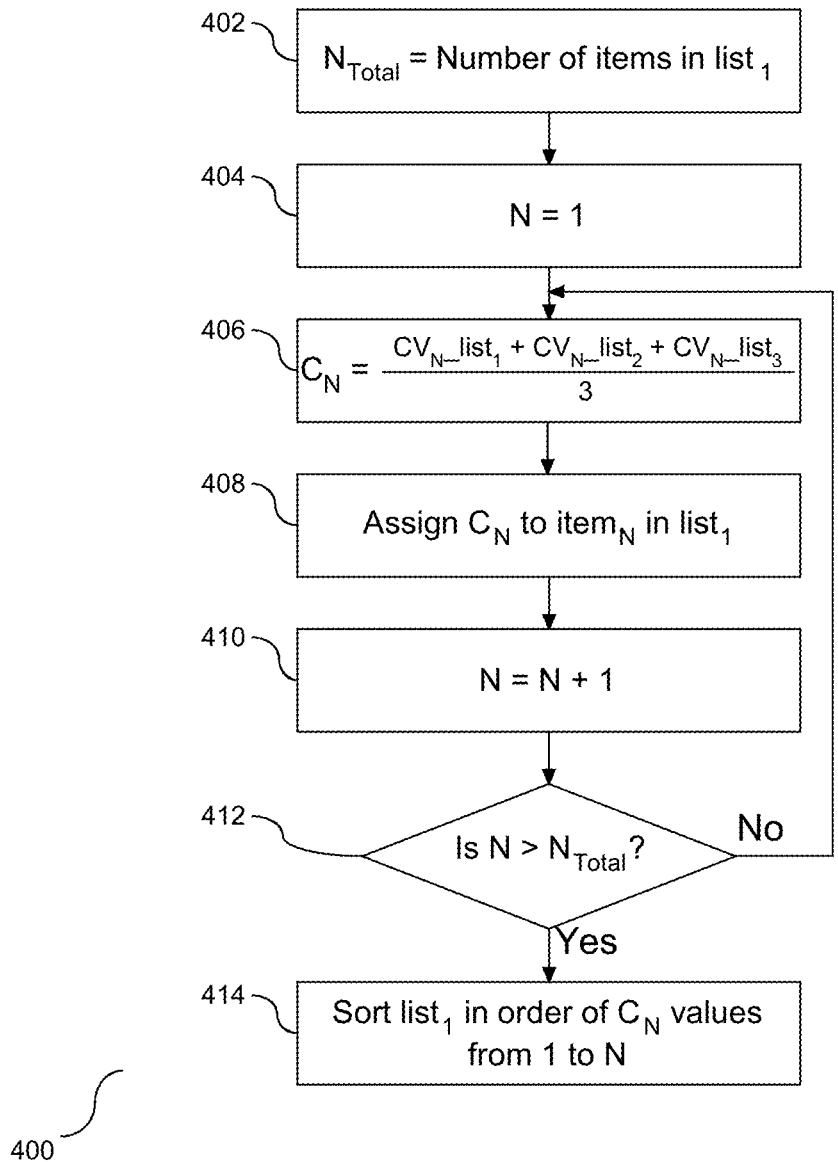
FIG. 4 is a flow chart illustrating a process for calculating an average weighted value for each of the query items and for consolidating and sorting the query lists based upon the average weighted values.

Each of the query lists are consolidated into a single list with an ordering of the items on the list based upon an average weighted calculation. FIG. 4 is a flow chart (400) illustrating a process for calculating an average weighted value for each of the query items and for consolidating and sorting the query lists based upon the average weighted values. The variable $N_{Total}$ is assigned to the number of query items in list₁ (402), and a counting variable N is assigned to the integer one (404). The average weighted value for each query items is calculated (406) based on the following formula:

$$C_N = [CV_N\_list_1 + CV_N\_list_2 + CV_N\_list_3]/3$$

In one embodiment, the query lists may exceed the quantity of three shown in this example, and the average weighted value formula would be extrapolated to include each return query list. The average weighted value, $C_N$, is assigned to $item_N$ in $list_1$ (408). Following step (408), the counting variable N is incremented (410), and it is determined if each item in $list_1$ has been processed for an average weighted value (412). A negative response to the determination at step (412) is followed by a return to step (406). Conversely, a positive response to the determination at step (412) is followed by sorting $list_1$ based on an order of the calculated weighted values from 1 to N (414). The order may be in either ascending or descending order. Accordingly, the placement of each item in each return list is employed as a factor in a final sorted list of returned query items.

FIG. 5 is a block diagram (500) illustrating returned query results and the organization and sorting thereof. As shown, three queries (510), (530), and (550) are submitted to a search engine. As illustrated above, the three queries may be to the same search engine with different arrangement of the string of characters, or one or more of the queries may be from a different search engine. Each query is shown returning four queries items (570), (572), (574), and (576), and each of the three query results are shown aligned. More specifically, the first query is shown with four returned query results (512), (514), (516), and (518), with each result having an associated calculated value (520), (522), (524), and (526). The first query is the baseline for the query evaluation and consolidation, the calculated value for each query result item is based upon their position in the returned query list. For example, the first query result item (512) has a calculated value (520) of one, the second query result item (514) has a calculated value (522) of two, the third query result item (516) has a calculated value (524) of three, and the fourth query result item has a calculated value (526) of four. Accordingly, the items in the first set of query results are assigned both a numerical identifier and calculated value, which are equivalent for each item position and assigned based upon the relative position in the list of query results.

As the query items in the three queries (510), (530), and (550) are aligned, the query results of the second query are listed based upon how they match with the query results of the first query. More specifically, the first listed result (532) of the second query (530) is the second result listed in the second query (530), as reflected by its numerical value. The second listed result (534) of the second query (530) is the third result listed in the second query (530), as reflected by its numerical value. The third query does not have a query item returned that matches the third listed result (516) of the first query (510), and as such, there is no numerical value in this position (536). Finally, the fourth listed result (538) of the second query (530) is the twenty fifth listed result listed in the second query (530), as reflected by its numerical value.

With respect to the third query, the query results of the third query are listed based upon how they match with the query results of the first query. More specifically, the first listed result (552) of the third query (550) is the tenth result listed in the third query (550), as reflected by its numerical value. The second listed result (554) of the third query (550) is the twelfth result listed in the third query (550), as reflected by its numerical value. The third query does not have a query item returned that matches the third listed result (516) of the first query (510), and as such, there is no numerical value in this position (556). Finally, the fourth listed result (558) of the third query (550) is the third listed result listed in the first query (510), as reflected by its numerical value.

As explained above, the calculated result is the smaller of the search order of the item under consideration or double the smallest search order, with the search order being the identifier associated with the item from the initial query result. Based upon this formulation, the calculated result of the first query item (570) in the second query has a value of two (542), and the calculated result of the first query item (570) in the third query has a value of two (562), both being double the smallest search order. The calculated result of the second query item (572) in the second query has a value of three (544) as the search order of the item under consideration, and the calculated result of the second query item (572) in the third query has a value of four (564) as double the smallest search order. The calculated result of the third query item (574) in the second query has a value of six (546) and the calculated result of the third query item (574) in the third query has a value of six (566), both being double the smallest search order. The calculated result of the fourth query item (576) in the second query has a value of six (548) being double the smallest search order, which in this case is the search order reflected in the third query and not the search order reflected in the first query. The calculated result of the fourth query item (576) in the third query has a value of three (568) being the search order of the item under consideration. Accordingly, the result is calculated for each returned query item and each query.

Once all of the calculated results have been assessed for each query and each query item, a weighted average is assessed for each query item. FIG. 6 is a block diagram illustrating returned query results, calculated values, and an assessed weighted average. As shown, three queries were submitted (610), (630), and (650) and four returned query items were evaluated (670), (672), (674), and (676). For each query item, a calculated value was assigned, as shown in FIG. 5. More specifically, the first query (610) has calculated values (612), (614), (616), and (618) designated for the four query results (670), (672), (674), and (676), respectively. Similarly, for the second query (630) calculated values (642), (644), (646), and (648) are designated for the four query results (670), (672), (674), and (676), respectively, and for the third query (650) calculated values (662), (664), (666), and (668) are designated for the four query results (670), (672), (674), and (676), respectively. The weighted average is a quotient of the summation of the calculated values for each query result and the quantity of queries. More specifically, for the first query result (670), the weighted average (680) is the sum of the calculated values at (622), (642) and (662) divided by three. For the second query result (672), the weighted average (682) is the sum of the calculated values at (624), (644) and (664) divided by three, for the third query result (674), the weighted average (684) is the sum of the calculated values at (626), (646) and (666) divided by three, and for the fourth query result (676), the weighted average (686) is the sum of the calculated values at (628), (648) and (668) divided by three. Accordingly, a separate weighted average is calculated and associated with each query result.

Once all of the weighted averages have been calculated as shown in FIG. 6, the query results are sorted based upon a comparison of the weighted averages. FIG. 7 is a block diagram (700) illustrating a sort of the returned query results, together with the calculated values, and assessed weighted averages. As shown, there are four returned query items (770), (772), (774), and (776). The weighted average (780) of the first query item (770) is the smallest, followed by the weighted average (782) of the second query item (772), the weighted average (786) of the fourth query item (776), and finally the weighted average (784) of the third query item (774). As shown, multiple query submissions are combined into a single result set of query items that are sorted and returned based upon the weighted average. More specifically, as shown in this example, the first and second query items retain their original positions in the final sort. However, the fourth query item (776) became the third item returned in the sorted list, followed by the third item (774). Accordingly, the calculated values and weighted average affected the final positioning of the query items in the sorted result set.

As illustrated above in FIGS. 1-7, multiple queries submitted to the same search engine or to different search engines can be compiled into a single result set, with the result set sorted based upon a compilation of calculated values and weighted averages for each returned query item.

As is understood, different embodiments may employ different logical formulas to evaluate the aligned query results, thereby having different calculated values for the different query submissions. Different weighted values may be calculated based upon the different factors of the calculated values.

Figure 8:
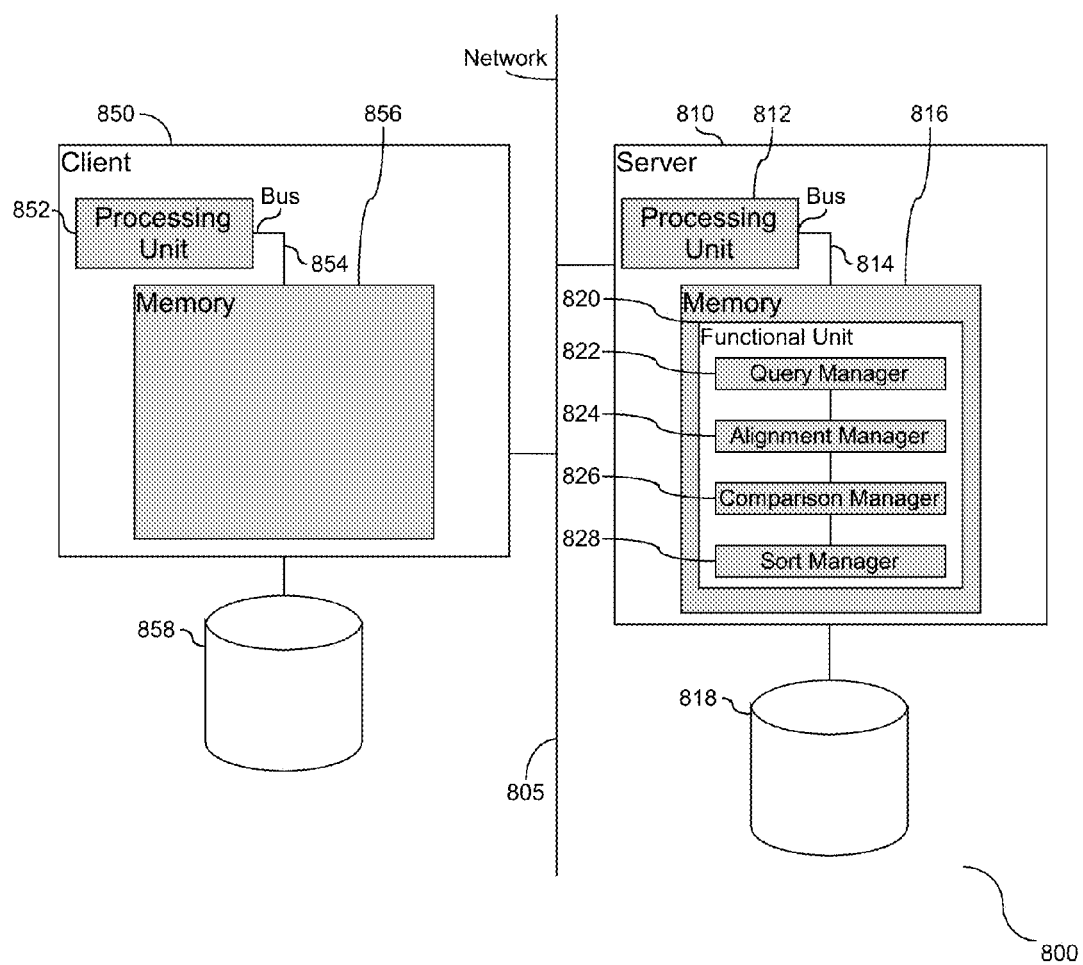
FIG. 8 depicts a block diagram illustrating tools embedded in a computer system to provide query management and consolidation.

Support for the query result evaluation and consolidation may be provided by hardware and/or software tools. FIG. 8 is a block diagram (800) illustrating tools embedded in a computer system to provide query management and consolidation of query results. As shown, a computer system is provided with a server (810) in communication with a client machine (850) over a network (805). Although only one server (810) and one client machine (850) are shown herein, in one embodiment, multiple client machines and/or servers may be provided in communication over the network (805). As shown, the server (810) is provided with a processing unit (812) in communication with memory (816) across a bus (814) and in communication with local data storage (818), and client machine (850) is provided with a processing unit (852) in communication with memory (856) across a bus (854) and in communication with data storage (858).

The server (810) is configured to receive a query from the client machine (850). To support the query and query result consolidation, the server (810) is provided with a functional unit (820) with managers embedded therein. More specifically, the functional unit (820) includes tools in the form of managers to support query submission, query result alignment, query result comparison, and sorting of the query results. The managers include, but are not limited to a query manager (822), an alignment manager (824), a comparison manager (826), and a sort manager (828). The query manager (822) is responsible for submission of a query to a search engine. In one embodiment, the search engine is a tool on a remote server in communication with the server (810) across the network (805). The query manager (822) submits a first query having a first arrangement of a string of characters to a first search engine (not shown). The query manager (822) may submit additional queries to the same search engine or to different search engines. The one or more additional queries to the same search engine may include the same search string with a different string arrangement, and the additional queries to a different search engine may include the same search string with the same arrangement or a different arrangement of the string of characters. Accordingly, the query manager (822) is responsible for submission of one or more queries to the search engine(s).

Each query submitted by the query manager (822) to a search engine produces a set of query results. In one embodiment, the query manager (822) submits three queries, with the first query producing a first set of query results, the second query producing a second set of query results, and the third query producing a third set of query results. In one embodiment, the query manager (822) may submit additional queries, with each query submission producing a set of query results. Following submission of the queries, the alignment manager (824) which is in communication with the query manager (822), aligns the query results from each of the query submissions. More specifically, one of the queries and its associated results are the basis for the comparison and consolidation, hereinafter referred to as a baseline query. Each of the other queries is compared to the baseline query. For purposes of explanation, the first query and its associated query results may be the baseline query. The query results of the second and third queries are aligned with the query results of the first query. See FIGS. 5-7 for an example of query result alignment.

Once the query results are aligned, the comparison manager (826), which is in communication with the alignment manager (824), compares the query result sets. More specifically, the comparison manager (826) calculates and assigns a calculated value to each query item returned in each of the query result sets. In addition, following the calculation and assignment of the calculated values to the query items, the comparison manager (826) calculates a weighted average value for each returned and aligned query item, with the weighted average being an average mathematical evaluation of the associated calculated values. The sort manager (828) is provided in communication with the comparison manager. The sort manager (828) functions to sort the query result items of the first query based upon the weighted average of the calculated values as ascertained by the comparison manager (826). In one embodiment, the sort manager (828) may perform the sort in ascending order or descending order. Similarly, in one embodiment, the sort manager (828) may employ different sort algorithms for sorting the query results. Accordingly, a set of managers (822)-(828) are provided to support consolidation and sorting of query result items.

As shown herein, the managers (822)-(828) of the functional unit (820) are provided local to the server (810), and more specifically, residing in memory (816) of the server (810). In one embodiment, the managers may reside as hardware tools external to memory (816), or they may be implemented as a combination of hardware and software. Similarly, in one embodiment, the managers may be combined into a single functional item that incorporates the functionality of the separate items. As shown herein, each of the manager(s) is shown local to one data site. However, in one embodiment they may be collectively or individually distributed across a shared pool of configurable computer resources and function as a unit to manage consolidation of query results. Accordingly, the managers may be implemented as software tools, hardware tools, or a combination of software and hardware tools.

As will be appreciated by one skilled in the art, aspects of the present invention may be embodied as a system, method or computer program product. Accordingly, aspects of the present invention may take the form of an entirely hardware based embodiment, an entirely software based embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
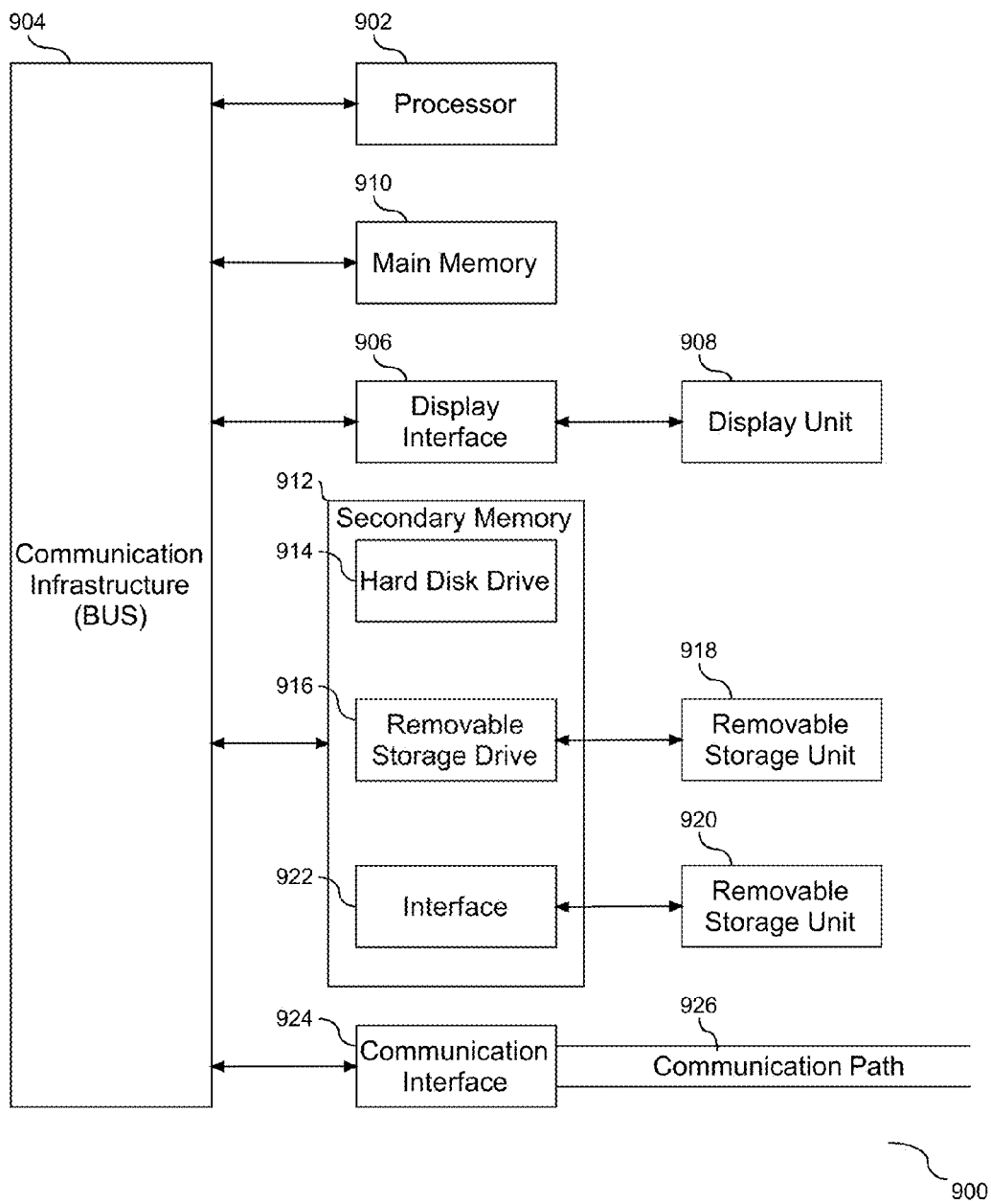
FIG. 9 depicts a block diagram showing a system for implementing an embodiment of the present invention.

Referring now to the block diagram of FIG. 9, additional details are now described with respect to implementing an embodiment of the present invention. The computer system includes one or more processors, such as a processor (902). The processor (902) is connected to a communication infrastructure (904) (e.g., a communications bus, cross-over bar, or network).

The computer system can include a display interface (906) that forwards graphics, text, and other data from the communication infrastructure (904) (or from a frame buffer not shown) for display on a display unit (908). The computer system also includes a main memory (910), preferably random access memory (RAM), and may also include a secondary memory (912). The secondary memory (912) may include, for example, a hard disk drive (914) and/or a removable storage drive (916), representing, for example, a floppy disk drive, a magnetic tape drive, or an optical disk drive. The removable storage drive (916) reads from and/or writes to a removable storage unit (918) in a manner well known to those having ordinary skill in the art. Removable storage unit (918) represents, for example, a floppy disk, a compact disc, a magnetic tape, or an optical disk, etc., which is read by and written to by removable storage drive (916). As will be appreciated, the removable storage unit (918) includes a computer readable medium having stored therein computer software and/or data.

In alternative embodiments, the secondary memory (912) may include other similar means for allowing computer programs or other instructions to be loaded into the computer system. Such means may include, for example, a removable storage unit (920) and an interface (922). Examples of such means may include a program package and package interface (such as that found in video game devices), a removable memory chip (such as an EPROM, or PROM) and associated socket, and other removable storage units (920) and interfaces (922) which allow software and data to be transferred from the removable storage unit (920) to the computer system.

The computer system may also include a communications interface (924). Communications interface (924) allows software and data to be transferred between the computer system and external devices. Examples of communications interface (924) may include a modem, a network interface (such as an Ethernet card), a communications port, or a PCMCIA slot and card, etc. Software and data transferred via communications interface (924) are in the form of signals which may be, for example, electronic, electromagnetic, optical, or other signals capable of being received by communications interface (924). These signals are provided to communications interface (924) via a communications path (i.e., channel) (926). This communications path (926) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (910) and secondary memory (912), removable storage drive (916), and a hard disk installed in hard disk drive (914).

Computer programs (also called computer control logic) are stored in main memory (910) and/or secondary memory (912). Computer programs may also be received via a communication interface (924). Such computer programs, when run, enable the computer system to perform the features of the present invention as discussed herein. In particular, the computer programs, when run, enable the processor (902) to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Alternative Embodiment

It will be appreciated that, although specific embodiments of the invention have been described herein for purposes of illustration, various modifications may be made without departing from the spirit and scope of the invention. In particular, the system can be configured to consolidate various items and should not be limited to consolidation of query results in the form of URLs. Accordingly, the scope of protection of this invention is limited only by the following claims and their equivalents.

We claim:

1. A computer implemented method comprising:
submitting a first query, by a physical processing unit in communication with memory, the query submission being in a first arrangement of a string of characters, and receiving a first set of search results in a first sorted order;
changing the first arrangement of the string of characters to a second arrangement of the string of characters, and submitting a second query, and receiving a second set of search results in a second sorted order, wherein the first and the second arrangements include same character patterns placed in a different order to evaluate search results of the first and second queries;
comparing the first and second sets of search results, including identifying common items in the first and second sets of search results and assigning a calculated value to each item returned in each of the first and second sets of search results, wherein each common item has two calculated values, one for each of the first and second sets of search results;
for each returned item in each of the first and second sets of search results, calculating a weighted average value for calculated values of each common item;
consolidating search results of the first and second queries including sorting the first sorted order based on the calculated weighted average values; and
eliminating duplicate items within a single returned set of results.

2. The method of claim 1, wherein the calculated value is a logical assessment of a relationship of placement of each returned item in the first sorted order with the items in the second sorted order.

3. The method of claim 1, further comprising limiting a quantity of entries in the first sorted order.

4. The method of claim 1, wherein the calculated value of each item returned is a combination of a smaller of an actual search order or a factor of the smallest of the sorted order assignment being compared.

5. The method of claim 1, wherein the first and second query submissions are submitted to a search engine selected from the group consisting of: different search engines, and non-different search engines.

6. A computer program product delivered as a service through a network connection, the computer program product comprising a computer readable storage device having computer readable program code embodied therewith, the computer readable program code comprising:
program code to receive and process query submissions, including a first query submission having a first arrangement of a string of characters, and a first set of search results returned from the processed first query submission in a first sorted order, and a second query submission having a second arrangement of the string of characters and a second set of search results returned from the processed second query submission in a second sorted order, wherein the first and the second character arrangements include same characters placed in a different order;
program code to compare the first and second sets of search results, including an identification of common items in the first and second sets of search results and assignment of a calculated value to each item returned in each of the first and second sets of search results, wherein the first and the second arrangements include same character patterns placed in a different order to evaluate search results of the first and second queries;
program code to calculate a weighted average value for calculated values of each common item;
program code to consolidate search results of the first and second queries including sorting the first sorted order based on the calculated weighted average value; and
program code configured to eliminate duplicate items within a single returned set of results.

7. The computer program product of claim 6, wherein the calculated value is a logical assessment of a relationship of placement of each returned item in the first sorted order with the items in the second sorted order.

8. The computer program product of claim 6, further comprising program code configured to limit a quantity of entries in the first sorted order.

9. The computer program product of claim 6, wherein the calculated value of each item returned is a combination of a smaller of an actual search order or a factor of the smallest of the sorted order assignment being compared.

10. The computer program product of claim 6, wherein the first and second query submissions are submitted to a search engine selected from the group consisting of: different search engines, and non-different search engines.

11. A system comprising:
   a server configured to receive a query;
   a functional unit in communication with the server, the functional unit comprising:
      a query manager, in communication with a processing unit, to submit a first query, the first query having a first arrangement of a string of characters, and the first query to return a first set of search results to the query manager in a first sorted order, the query manager to submit a second query, the second query having a second arrangement of the string of characters, and the second query to return a second set of search results to the query manager in a second sorted order, wherein the first and the second arrangements include same character patterns placed in a different order to evaluate search results of the first and second queries;
      a comparison manager in communication with the processing unit and the query manager, the comparison manager to compare the first and second sets of search results, including an identification of common items in the first and second sets of search results and assignment of a calculated value to each item returned in each of the first and second sets of search results, wherein each common item has two calculated values, one for each of the first and second sets of search results;
      for each returned item in each of the first and second sets of search results, the comparison manager to calculate a weighted average value for calculated values of each common item;
      a consolidating manager to consolidate search results of the first and second queries including sorting the first sorted order based on the calculated weighted average value; and
      the query manager to eliminate duplicate items returned within the first set of search results, and the query manager to eliminate duplicate items returned within the second set of search results.

12. The system of claim 11, wherein the calculated value defines a logical assessment of a relationship of placement of each returned item in the first sorted order with the items in the second sorted order.

13. The system of claim 11, further comprising the sort manager to limit a quantity of entries in the first sorted order.

14. The system of claim 11, wherein the calculated value of each item returned is a combination of a smaller of an actual search order or a factor of the smallest of the sorted order assignment being compared.

15. The system of claim 11, wherein the first and second query submissions are submitted to a search engine selected from the group consisting of: different search engines, and non-different search engines.

\* \* \* \* \*